UNITED STATES PATENT OFFICE.

FRIEDRICH PETRI, OF BERLIN, GERMANY.

DISINFECTANT.

SPECIFICATION forming part of Letters Patent No. 267,926, dated November 21, 1882.

Application filed May 17, 1881. (No specimens.) Patented in Belgium May 27, 1881, No. 54,743; in Germany May 27, 1881, No. 16,973; in France May 27, 1881, No. 143,065; in England May 27, 1881, No. 2,345; in Luxemburg May 27, 1881, No. 143; in Italy June 8, 1881, XXVI, 66; in Victoria July 12, 1881, No. 3,042; in Finland July 13, 1881; in Sweden July 22, 1881; in Spain August 25, 1881, No. 1,605; in New South Wales September 3, 1881, No. 984; in Portugal September 7, 1881, No. 691; in India September 12, 1881, No. 744; in Denmark October 7, 1881, No. 1,054; and in Austria-Hungary October 17, 1881, No. 17,028 and No. 36,857.

*To all whom it may concern:*

Be it known that I, FRIEDRICH PETRI, doctor of philosophy, a subject of the King of Prussia, residing at the city of Berlin, in the German Empire, have invented certain new and useful Improvements in Disinfectants; and I do hereby declare the following to be a full, clear, and exact description of the invention, such as will enable others skilled in the art to which it appertains to make and use the same.

The final disposition of the immense masses of sewage, fecal matter, and analogous substances deleterious to health, from large centers of population, as a sanitary as well as an economic measure, has for a long time attracted the attention of public functionaries, corporations, and individuals, as well as that of scientists. Many processes of and means for effecting this final disposition of the matter referred to have been proposed, yet, so far as I know, they are either impracticable or too costly.

My invention has for its object the practical and economical disposition of these organic substances; and it consists in the method of and means for treating the same, substantially as hereinafter fully described, and specifically pointed out in the claims.

In the defecation of sewage or analogous fluid or semi-fluid or viscous organic substances by means of disinfectants of a pulverulent form the practice has heretofore been to disseminate the powder over the surface thereof, and if the matter to be defecated was not absolutely or practically fluid the effect of the defecating agent employed was not only temporary but local—that is to say, but a comparatively small proportion of the matter treated is acted upon by the defecating agent, for the reason that all such agents as heretofore used were of less specific gravity than the matter treated, and consequently could not permeate the mass unless mechanical mixing of the defecating agent with the substances to be defecated were resorted to. In my improved method of treating such substances I employ a disinfecting agent of greater specific gravity than the substance treated, so that it will sink into and act upon the entire mass, and thereby dispense with the mechanical mixing necessary with disinfectants of less specific gravity than the matter treated, which is an important feature of this invention.

The disinfecting agent employed by me, although composed of substances the disinfecting properties of which are in part well known, (yet their action upon fecal matter, when combined, is imperfectly understood, and they have heretofore not been employed for this purpose,) imparts such a degree of plasticity to these substances as to adapt them to be worked like clay or analogous plastic materials.

My improved disinfectant consists of and is prepared in the manner as follows: I take fifty liters of a substance which I designate as "binding materials," and preferably use either the refuse of peat, or lignite, or coke, or other like organic substances. With the organic substance I mix about two liters of a liquid composed of from twenty to thirty per cent. of carbolic acid, and one per cent. of raw chloroform. The chloroform has the property of destroying the micro-organisms, such as the bacteriæ, the infusoriæ, the fungi, and others already present in the fecal masses or which are developed therein by contact with the atmosphere. To this compound I add two liters of a mixture of pulverized coke and sulphate of iron, (iron vitriol,) and instead of pulverized coke the cheaper cinders—such as pass through the grates of coal-burning furnaces—may be used after removing the ashes therefrom. To this compound I then add one-fourth of a liter of a solution of nitro-benzole in alcohol in the proportion of one part of the former to every one hundred parts of alcohol. Sulphate of iron, as is well known, is not readily pulverized, and to facilitate this reduction I mix it with the coke and pulverize the two by passing them through any suitable crushing-mill. Not only is the pulverization of the sulphate readily effected in the manner stated, but all its disinfecting properties are made available, the major part of which have heretofore been lost, owing to incomplete pulverization. The use of alcohol in combination with sulphate of iron prevents the too rapid oxidation of the latter when brought in contact with the atmosphere, while the nitro-benzole serves to destroy the micro-organisms already developed as well as their germs, and hence arrests fermentation. The composition of matter so obtained is now intimately mixed and powdered coke is added until its specific gravity is such that one hectoliter will weigh about fifty kilograms. The increase of the specific gravity of the disinfectant has for its object to cause it to sink into the fecal mass instead of remaining on its surface, as is the case with all disinfectants in a pulverulent form now used. In this manner when very large masses of fecal matter are treated, the formation of nests of micro-organisms in such parts of the mass as would not be penetrated by the disinfectant except by mechanical mixing are entirely avoided and such mechanical mixing dispensed with. If the fecal matter is treated immediately after its removal from the cesspool, or as it flows from the sewers into reservoirs, a larger proportion of the binding material may then be employed, which reduces the expenses considerably.

The quantity of the disinfectant required for defecation depends on the density of the mass treated. The proportion of the former should always be such as to leave the whole in a damp, plastic state, of which the fecal matter forms the adhesive element that holds the component parts together, yielding a solid product that is adapted for transportation without previous packing. The treated masses are stored in covered pits or sheds until sufficient quantities have accumulated to treat them mechanically, and may thus lie for years without detrimentally influencing the health of those living in the neighborhood of or at the depot.

If it is desired to treat large masses of fluid sewage for use as a fertilizer, I employ the disinfectant described in combination with a binding material—such as the refuse of peat, or lignite, or coke, or equivalent binding material—in proportion of from ten to twenty times the volume of powder. This may be placed into pits or ditches and the sewage conducted to and through it, whereby all the organic constituents of the sewage are filtered therefrom and disinfected and the fluid constituent will flow off clear and pure, or comparatively so.

Having now described my invention, what I claim is—

1. The herein-described process of compounding disinfectants, which consists in grinding coke or an analogous substance together with sulphate of iron to obtain an intimate mixture of the two, and mixing the pulverulent compound with carbolic acid and chloroform, and, lastly, adding to this compound a solution of nitro-benzole in alcohol, substantially as described, for the purpose specified.

2. The herein-described composition of matter, which consists of a substance such as pulverized coke or lignite, carbolic acid, chloroform, nitro-benzole, alcohol, and sulphate of iron, in or about in the proportions specified.

In testimony whereof I affix my signature in presence of two witnesses.

FRIEDRICH PETRI.

Witnesses:
BERTHOLD ROI,
GEORGE LOUBIER.